United States Patent

[11] 3,603,880

| [72] | Inventors | Nicholas L. Brecker, Jr.<br>Woodland Hills;<br>John B. Murphy, Culver City, both of, Calif. |
|---|---|---|
| [21] | Appl. No. | 675,520 |
| [22] | Filed | Oct. 16, 1967 |
| [45] | Patented | Sept. 7, 1971 |
| [73] | Assignee | The Bissett-Berman Corporation<br>Santa Monica, Calif. |

[54] SERVICE COMPUTER FOR INDICATING WHEN A PRODUCT SUCH AS AN AUTOMOBILE HAS TO BE SERVICED
11 Claims, 4 Drawing Figs.

[52] U.S. Cl. .................................................. 324/182,
340/309.1, 340/267
[51] Int. Cl. .................................................. G04f 9/00,
G08b 21/00
[50] Field of Search............................................ 324/68 ET,
94; 235/150.2; 340/309.4, 309.1, 267, 52

[56] References Cited
UNITED STATES PATENTS

| 3,290,669 | 12/1966 | Mews.............................. | 324/94 X |
| 3,355,731 | 11/1967 | Jones, Jr........................ | 324/94 UX |
| 3,409,873 | 11/1968 | Duffy............................. | 340/52 |
| 3,343,083 | 9/1967 | Beusman........................ | 324/94 |

*Primary Examiner*—Alfred E. Smith
*Attorney*—Smyth, Roston & Pavitt

ABSTRACT: This invention relates to a service computer and specifically to an automobile service computer for monitoring the operation of a device such as an automobile which requires a periodic servicing and for providing an output indication to the operator of the device when servicing is required. Specifically, the invention relates to an automobile service computer including a pair of output indicators such as output lamps and wherein the output lamps have different current requirements to produce visual indications so that the a passage of current of a first particular level through both of the lamps produces a visual indication in only one of the lamps and a passage of a second particular current level higher than the first through the other lamp produces a visual indication in the other lamp. The invention also includes the use of a computing element such as an electrochemical storage cell which has a pair of electrodes and contains active material for transfer between the pair of electrodes. The storage cell has a plurality of inputs so as to monitor the operation of the automobile and the monitoring results in the transfer of active material between the electrodes in accordance with the operation of an automobile. When all of the active material has been transferred from one of the electrodes, the resistance across the electrodes in the storage cell increases and this increase in resistance is used to control the application of current to either one or both of the output lamps thereby providing the output indication to the operator of the device.

INVENTORS:
Nicholas L. Brecker, Jr.
John B. Murphy

ATTORNEYS

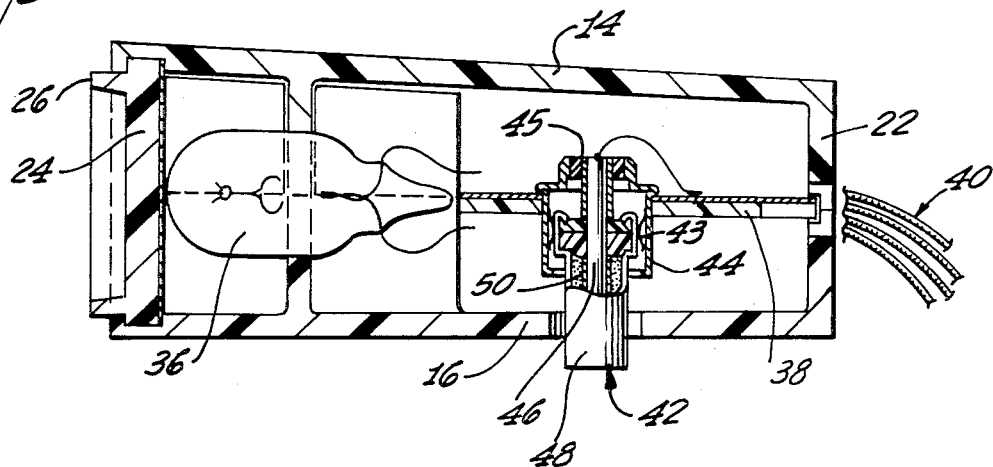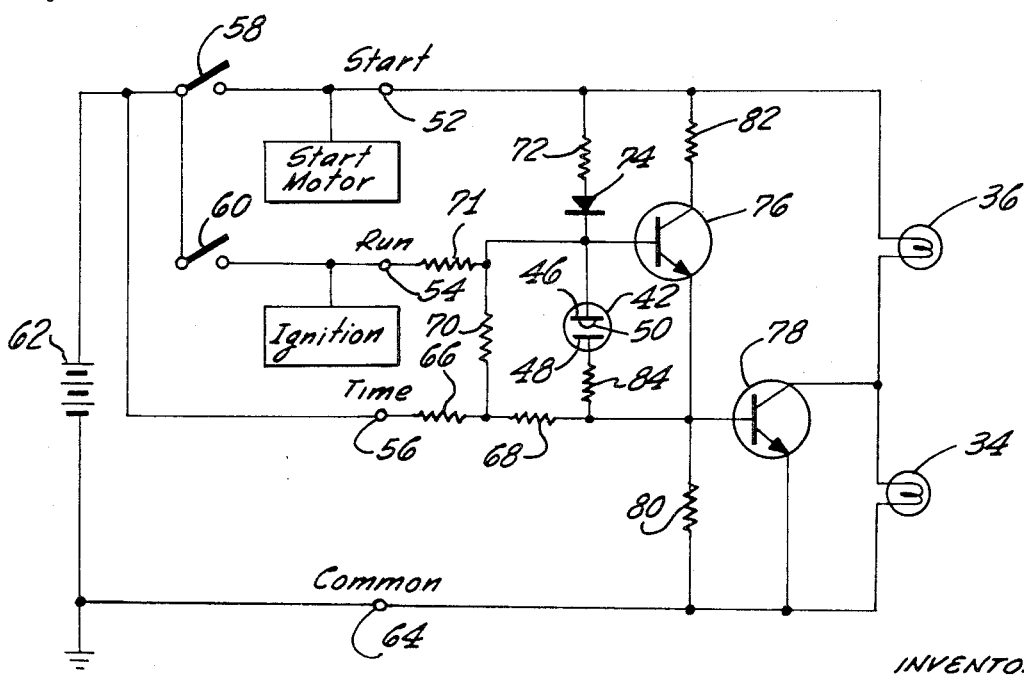

SERVICE COMPUTER FOR INDICATING WHEN A PRODUCT SUCH AS AN AUTOMOBILE HAS TO BE SERVICED

Automobiles are driven in many different ways in accordance with the needs of the operator of the automobile. Some automobiles are driven for long distances over freeways while others are driven for short distances within town. The manner in which the automobile is driven should determine the service interval. However, the service interval is now arbitrarily chosen by the automobile manufacturers to be some particular period of time or mileage figure. This choice is at best a bad average for the majority of automobiles. The automobile should be serviced according to the manner in which the automobile is operated and the service interval should therefore be determined in accordance with the individual operating conditions of the individual automobile.

The present invention therefore is directed to an automobile service computer which monitors the operation of a particular automobile and provides an output indication that service is required in accordance with the individual operating conditions of the particular automobile. In order to more accurately determine the proper service interval, a plurality of inputs, each related to a different operating condition, are applied to the service computer of the present invention so that the service interval may be very accurately gauged from the plurality of inputs. Specifically, the inputs to the service computer in the particular example disclosed in this application are the number of hours of engine running time, the total engine starting time and the overall passage of time.

The automobile service computer of the present invention includes a pair of output indicators such as output lamps. The output indicators visually inform the operator of the automobile that service is either required or not required each time the engine is started. After the automobile has been started, the lamps are extinguished so that the operator of the automobile is not annoyed by a constant light from the computer. Therefore, the visual indications only occur during the starting of the automobile. The service computer includes the two output lamps to provide the visual output indication and the lamps have different current requirements in order to provide for a visual indication.

The service computer of the present invention also includes an electrochemical storage cell which provides for an integration of the information supplied to the cell about the operation of the automobile. The storage cell has a pair of electrodes and includes active material and wherein the active material is transferred between the electrodes in accordance with the operation of the automobile. Specifically, an initial charge of active material is included on one of the electrodes. As the automobile is operated, this active material is transferred from the one electrode to the other electrode.

During the time that active material is on both electrodes, the service computer applies a low current through both of the output lamps so as to produce a visual indication from the one output lamp which has a low current requirement. When all of the active material is transferred from one electrode so that active material appears on only one of the pair of electrodes, the resistance across the electrodes rises. When the resistance rises, the service computer applies a higher current through the other of the output lamps so that the other of the output lamps produces a visual indication to inform the operator of the automobile that service is required. The service computer of the present invention is designed so that only during the starting of the automobile engine is there sufficient current to light either of the lamps.

For a fuller description of the operation of the electrolytic cell, reference is made to application Ser. No. 576,601 filed on Sept. 1, 1966 in the name of Martin Mintz and Leon P. Brown and assigned to the same assignee as the instant application. Also, background information relating to electrochemical service computers in general, reference is made to application Ser. No. 561,817 filed on June 30, 1966, in the name of Thomas B. Bissett and Martin S. Tatch and assigned to the same assignee as the instant application.

A clearer understanding of the invention will be had with reference to a particular example of the invention contained in the following description and drawings wherein:

FIG. 3 is a side view of an automobile service computer constructed in accordance with the teachings of the present invention taken along line 3—3 of FIG. 1.

FIG. 4 is a schematic drawing illustrating the circuitry of the automobile service computer and the connections of the service computer into an automobile.

Figure 1:
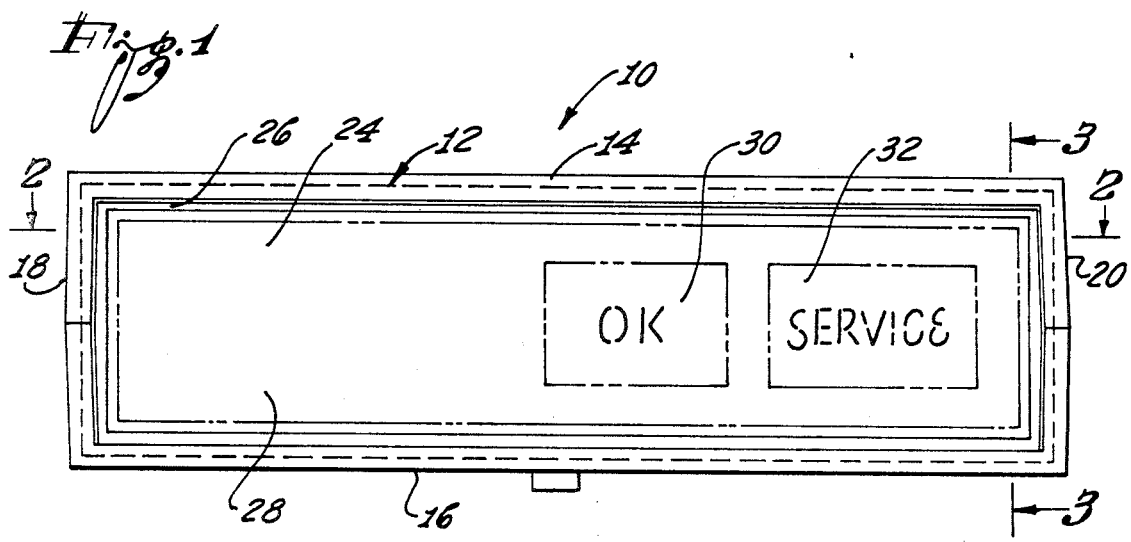
FIG. 1 is a front view of an automobile service computer constructed in accordance with the teachings of the present invention.
Figure 2:
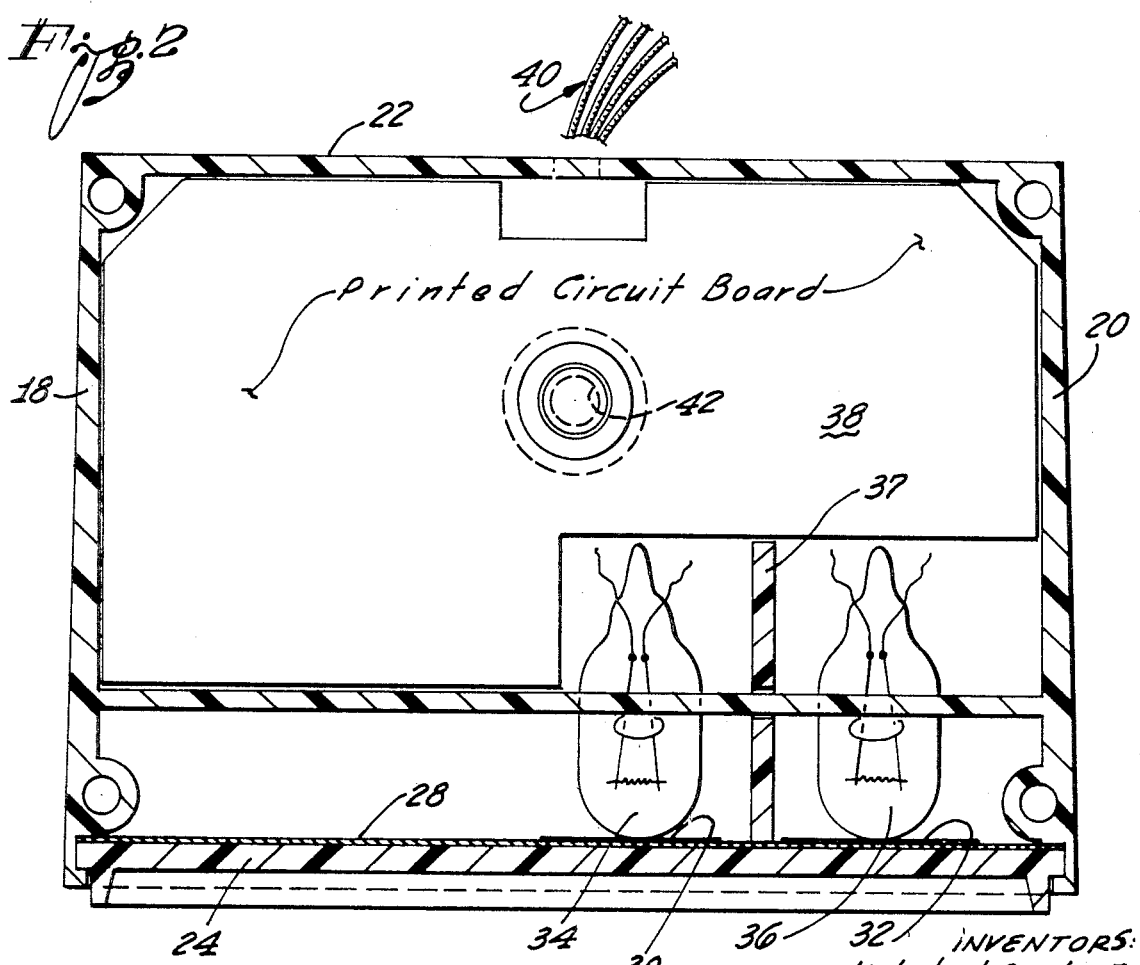
FIG. 2 is a top view of the automobile service computer of the present invention taken across line 2—2 of FIG. 1.

In FIG. 1 an automobile service computer 10 is contained in a housing 12 which has top wall 14, bottom wall 16, sidewalls 18 and 20, and, as seen in FIGS. 2 and 3, backwall 22. A front face 24, as seen in FIGS. 2 and 3, is constructed of transparent plastic material. An outstanding ridge 26 extends around the member 24 so as to shield the face of the member 24 from external light. The portion 28 of the face 24 may be rendered opaque by painting or depositing material on the back surface of the member 24, as seen in FIG. 2. The front surface of the member 24 may therefore be used to receive indicia representing the name of the manufacturer or the trade name of the product.

Two areas 30 and 32 are rendered semitransparent through the use of material painted or deposited on the back surface of the member 24. In addition the areas 30 and 32 include visual information to the operation of the automobile. For example, the word "OK" appears in area 30 and the word "Service" appears in area 32. The information such as "OK" or "Service" will not be visually apparent to the viewer until the particular portions of the back of the member 24 are lighted. As a further means of identifying to the operator whether service is required or service is not required, the areas 30 and 32 may be colored in particular representative colors such as green for the area 30 and red for the area 32. Therefore, when no service is required and upon the starting of the automobile, the area 30 is backlighted so as to display to the operator of the automobile a green area containing the word "OK." When service is required and upon the starting of the automobile the area 32 is backlighted so as to display to the operator of the automobile a red area containing the word "Service." It is to be appreciated that any colors or words may be used, and that those disclosed in this application are illustrative only.

In FIG. 2 a pair of lamps 34 and 36 are shown mounted behind the areas 30 and 32 and optually isolated from each other by an opaque wall member 37. As indicated above the lamps 34 and 36 are energized in accordance with the operation of the automobile in order to visibly display the words "OK" or "Service" to the operator of the automobile. The lamps are connected into a printed circuit board 38 which contains the appropriate electronics to monitor the operations of the automobile and control the lamps. Wires 40 are connected into the automobile in a manner to be explained later so that the computer 10 may monitor the operation of the automobile.

In general the operation of the automobile is monitored by the supplying of information to an electrochemical storage cell 42 shown in FIG. 3. The storage cell 42 is contained in a socket 44 which is connected to the board 38. The socket 44 includes contact areas 43 and 45 insulated from each other. The cell 42 includes a pair of electrodes such as inner electrode 46 and outer housing 48 and active material such as material 50 plated on inner electrode 46 to have a transfer of the active material from one electrode to the other in accordance with the operation of the automobile. After all of the active material is transferred from the one electrode, the area 32 is backlighted to indicated to the operator that service is required. The automobile service computer is reset by pulling out the electrochemical storage cell 42 and inserting a new electrochemical storage cell which again has a charge of active material on the electrode.

FIG. 4 illustrates the schematic of particular circuitry which may be used for the automobile service computer. In FIG. 4 the lamp 34 to backlight the area 30, the lamp 36 to backlight the area 32, and the electrochemical storage cell 42 are shown. The storage cell 42 includes the pair of electrodes 46 and 48. The charge of active material 50 is included on the one electrode 46. In accordance with the operation of the service computer the active material 50 is transferred from the electrode 46 to the electrode 48. Upon the transfer of all of the active material from the electrodes 46 to the electrode 48, the resistance across the electrodes 46 and 48 rises.

In the particular embodiment of the automobile service computer disclosed in this application, three inputs from the automobile are connected to the computer. These inputs to the computer are connected to the terminal 52 marked "start," the terminal 54 marked "run" and the terminal 56 marked "time." The terminal 52 is connected to the start portion of the ignition switch designated as switch 58. The terminal 54 is connected to the ignition portion of the ignition switch designated as switch 60. Finally the time terminal 56 is directly connected to a storage battery 62 contained in the automobile. There is also a common terminal 64 which is grounded to the body of the automobile.

When the automobile is normally started, a key is inserted into the ignition switch and this ignition switch has a first position as shown by the switch 60 so as to connect the power from the storage battery 62 to the ignition circuitry. The key is further turned thereby closing the switch 58 so as to activate the starter motor. One the automobile is started the pressure on the key is released and the switch 58 is opened while the switch 60 remains closed.

It can be seen from the circuit of FIG. 4 that the terminal 56 receives information in accordance with the passage of time. The passage of time is a factor in any service program since various components in the automobile deteriorate even though not used. The terminal 54 receives information in accordance with the time during which the engine is operated since terminal 54 receives current when the switch 60 is closed. Finally the terminal 52 receives information in accordance with the number of starts and the length of time for each start since the terminal 52 receives current only when the start switch 58 is closed.

The information from the terminal 56 is fed through a resistance network including resistors 66, 68 and 70, so as to lower the current to the electrochemical storage cell 42 appreciably. This is necessary since the passage of time is a smaller factor in the operation of the automobile than the other two factors indicated above. The current from the terminal 56 as modified by the resistance network is applied to the electrochemical cell 42 to transfer the active material 50 from the electrode 46 to the electrode 48. The current supplied from the terminal 54 passes through a resistor 71 to transfer active material 50. Finally, during the time of starting, the current from the terminal 52 is coupled through the resistor 72 and the diode 74 and is applied to the electrochemical storage cell 42. The value of the resistors 71 and 72 are adjusted to provide for the proper balance of current fed to the cell 42.

The circuit of the automobile service computer of the present invention also includes a pair of transistors 76 and 78, and a pair of resistors 80 and 82. The resistors 80 and 82 provide for the proper biasing of the transistors 76 and 78. The diode 74 is also used to prevent current from the terminals 56 and 54 from flowing toward the start motor. Finally a resistor 84 may be used to limit the current flowing through the cell 42 and to provide a constant voltage drop of the base of transistor 76. This insures a positive operation of the transistor 76 in combination with the storage cell 42.

In the operation of the automobile service computer we first assume the condition when active material is on both electrodes 46 and 48 of the cell 42. At this time the resistance of the electrochemical storage cell 42 is relatively low. The voltage across the storage cell 42 is therefore correspondingly low and the voltage at the base of the transistor 76 is therefore maintained at a relatively low point. The transistors 76 and 78 are therefore turned off. As the automobile is started, the switches 58 and 60 are closed. The current from the switch 58 is not only used for the transfer of active material within the storage cell 42 but the current from the switch 58 also passed through the output lamps 34 and 36.

The lamps 34 and 36 have differing current requirement in order to produce a visual indication. The lamp 34 is designed to have a much lower current requirement to produce a visual indication than the lamp 36. As the current from the terminal 52 passes through both the lamps 36 and 34, the current is only sufficient to produce a visual output indication from the lamp 34. Therefore, when the switch 58 is closed and when the storage cell 42 has active material on both electrodes, the lamp 34 produces a visual indication which registers to the operator of the automobile as the area 30 lights up to disclose the word "OK."

Once the engine is started, the switch 58 is opened, and currents from the terminals 54 and 56 continue to cause a deplating of the active material 50. However, the currents flowing in the circuit once the switch 58 is open do not affect either of the lamps 34 or 36. Since the resistance of the electrochemical storage cell 42 is low, and the voltage across the cell is correspondingly low, the transistors 76 and 78 are turned off. After all of the active material 50 is deplated, the resistance across the storage cell 42 rises. Once the resistance rises, the voltage across the storage cell 42 also rises and the voltage at the base of the transistor 76 increases so as to turn on the transistor 76.

The turning on of the transistor 76 has no effect on the circuit until the switch 58 is closed. The next time the automobile is started and the switch 58 is closed, the transistor 76 is turned on, which turns on the transistor 78. The output lamp 34 is therefore shorted out by the transistor 78 and the current from the terminal 52 flows through the output lamp 36 and back to ground through the transistor 78. The current through the lamp 36 now is sufficient to light the output lamp 36 thereby providing an indication at the front face 24 that service is required by the backlighting of the area 32. Once the switch 58 is opened after the automobile is started, the current flowing in the circuit is not sufficient to light the output lamp 36. Therefore, the lamps 34 and 36 only provide output indications to the operator of the automobile when the switch 58 is closed. This prevents the output indication from constantly appearing on the dashboard of the automobile. If the automobile is not used for a sufficient period of time, the storage cell 42 has a tendency to accumulate a small charge of active material to lower the voltage. The combination of the voltage drop provided by the cell 42 and the resistance 84 is sufficient to turn on the transistor 76.

Once the storage cell 42 has the active material 50 completely deplated from the electrode 46, the operator of the automobile sees the red area 32 light up indicating that service is required each time the automobile is started. The area 32 lights up until the operator has the automobile serviced. After the automobile is serviced, the service computer may be reset by pulling out the old electrochemical storage cell 42 and plugging in a new one which contains a new charge of active material. It is to be appreciated that the manufacturer may easily adjust the service interval by adjusting the charge of active material. In this way, the service program may be constantly upgraded in accordance with the latest information, and in accordance with local conditions.

It is also to be appreciated that the service computer may be reset by means other than the use of a new plug-in cell, such as the use of circuitry in the computer which may be controlled to replate the active material back on the electrode 46. It is further to be appreciated that, although the invention has been described with reference to an automobile service computer, the computer disclosed in this application may be used on other devices which require periodic servicing. For example, any type of equipment incorporating an engine may use a computer as disclosed in the present application. It is also to be appreciated that, although the invention has been described with reference to a particular embodiment, other adaptations and modifications may be made and the invention is only to be limited by the appended claims.

We claim:

1. In a system for monitoring the operation of a device requiring periodic servicing and for providing an output indication when service is required, the combination of a pair of output indicators and wherein a first one of the pair of output indicators provides an indication that servicing is not required and wherein a second one of the pair of output indicators provides an indication that servicing is required, first means coupled to the device for providing an initiating of the operation of the device, an electrochemical storage element having first and second electrodes and an active material transferable between the electrodes in accordance with the flow of current through the electrodes, the electrochemical storage element having a relatively low impedance between the first and second electrodes during the existence of active material on both of the electrodes and having a relatively high impedance upon the transfer of all of the active material from one of the electrodes to the other and initially having active material on both of the electrodes, the electrochemical storage element being connected in a circuit with the first means for transferring the active material from one electrode to the other in the electrochemical storage element during the operation of the device, and third means coupled to the first means, the electrochemical storage element and pair of output indicators for providing an activation of the first output indicators, in accordance with the initiation of the operation of the device, during the production of the relatively low impedance between the first and second electrodes of the electrochemical storage element in accordance with the existence of active material on both of the electrodes of the electrochemical storage element and for providing an activation of the second output indicator, in accordance with the initiation of the operation of the device, upon the production of the high impedance between the first and second electrodes of the electrochemical storage element.

2. The system of claim 1 wherein the pair of output indicators are a pair of lamps and wherein the passage of current of a particular value through both lamps provides a visible output indication in only the first one of the pair of lamps.

3. The system of claim 1 wherein the device which is monitored is an automobile and wherein the electrochemical storage element is responsive to the number of times the automobile is started and the length of time of operation of the automobile.

4. In a system for monitoring the operation of a device requiring periodic servicing and for providing an output indication when service is required, the combination of a pair of output lamps and wherein a first one of the pair of output lamps provides a visual indication that servicing is not required and wherein a second one of the pair of output lamps provides a visual indication that servicing is required, first means coupled to the device for initiating the operation of the device, an electrochemical storage element having a pair of electrodes and active material on at least one of the electrodes and having an electrolyte for transfer of the active material between the electrodes, the electrochemical storage element having a relatively low impedance during the existence of the active material on both of the electrodes and having a relatively high impedance upon the transfer of all of the active material from one of the electrodes, the electrochemical storage element being connected in a circuit with the first means for monitoring the operation of the device to produce the low impedance in the electrochemical storage element, during the operation of the first means, when servicing is not required and to produce the high impedance in the electrochemical storage element, during the operation of the first means, when servicing is required, and second means coupled to the first means and pair of output lamps for providing an activation of the first output lamp in accordance with the initiation of the operation of the device by the first means when the electrochemical storage element has the low impedance and for providing an activation of the second output lamp in accordance with the initiation of the operation of the device by the first means when the electrochemical storage element has the high impedance.

5. The system of claim 4 wherein the output lamps have different current requirements so that the passage of a first particular current level through both output lamps produces a visible output indication in only one of the output lamps and wherein the second means is constructed to provide current at the first particular level through both lamps during the low impedance in the electrochemical storage element and is constructed to provide a current through only the second lamp, at a second particular level greater than the first particular level, during the high impedance in the electrochemical storage element.

6. The system of claim 4 wherein the output lamps have different current requirements to produce visible output indications and wherein the current requirement through the first lamp is at a first particular level and the current requirement through the second particular lamp is at a second particular level greater than the first particular level and wherein the second means controls the passage of current of a first particular level through both output lamps to produce a visible output indication in only the first one of the output lamps during the low impedance in the electrochemical storage element and wherein the second means controls the passage of current through the second output lamp to produce a visible output indication in only the second lamp during the high impedance in the electrochemical storage element.

7. The system of claim 4 wherein the first output lamp has a lower current requirement than the second output lamp to produce a visible output indication and wherein the second means is connected to provide a passage of current of a first particular level through both the first and second output lamps, during the low impedance in the electrochemical storage element, to produce a visible output indication in only the first output lamp and wherein the second means is connected to provide a passage of current of a second particular level higher than the first particular level through only the second output lamp, during the high impedance in the electrochemical storage element, to produce a visible output indication in the second output lamp.

8. In a system for monitoring the operation of an automobile requiring periodic servicing and for providing an output indication when service is required, the combination of a pair of output indicators and wherein a first one of the pair of output indicators provides an indication that servicing is not required and wherein a second one of the pair of output indicators provides an indication that servicing is required, first means coupled to the automobile for initiating the operation of the automobile, second means coupled to the automobile and operative during the period of operation of the automobile, third means coupled to the automobile and operative during the transpiration of time, an electrochemical storage cell responsive to the operation of the first, second and third means for monitoring the operation of the automobile, the storage cell including a pair of electrodes and an electrolyte and active material for transfer by the electrolyte between the electrodes in accordance with the operation of the automobile, the storage cell having a low impedance during the occurrence of active material on both of the electrodes and having a high impedance upon the transfer of all of the active material from one of the electrodes to the other electrode and being responsive to the operation of the first, second and third means for obtaining a transfer of the active material from one of the electrodes to the other electrode, and fourth means coupled to the first, second and third means, the electrochemical storage cell and the pair of output indicators for providing an activation of the first output indicator, in accordance with the initiation of the operation of the first means, when the storage cell has a low impedance and for providing an activation of the second output indicator, in accordance with the initiation of the operation of the first means, when the storage cell has a high impedance.

9. The system of claim 8 wherein the first and second output indicators receive current from the fourth means during the occurrence of the low impedance in the electrochemical storage cell and wherein only the second output indicator receives current from the fourth means during the occurrence of the high impedance in the electrochemical storage cell.

10. The system of claim 8 wherein the first output indicator is constructed to produce an output indication at a first particular level of current and the second output indicator is constructed to produce an output indication at a second particular level of current greater than the first particular level of current and wherein the fourth means provides a flow of current through the first and second output indicators at the first particular level during the occurrence of the low impedance in the electrochemical storage cell and wherein the fourth means provides a flow of current through only the second output indicator during the occurrence of the high impedance in the electrochemical storage cell.

11. The system of claim 10 wherein the first and second output indicators are light bulbs.